O. W. FISHER.
VEGETABLE SORTER.
APPLICATION FILED JUNE 29, 1911.
1,021,979.
Patented Apr. 2, 1912.
2 SHEETS—SHEET 2.
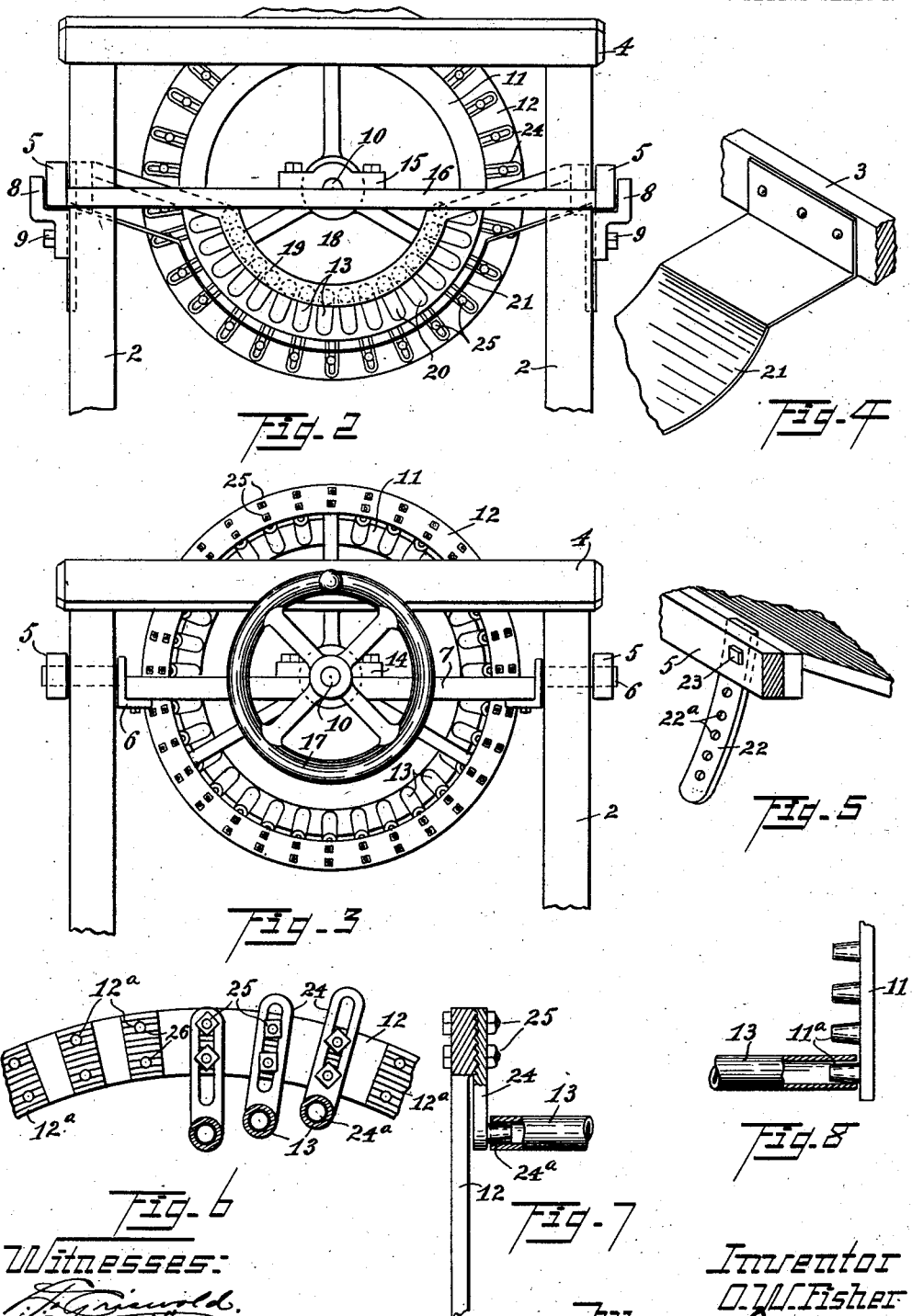

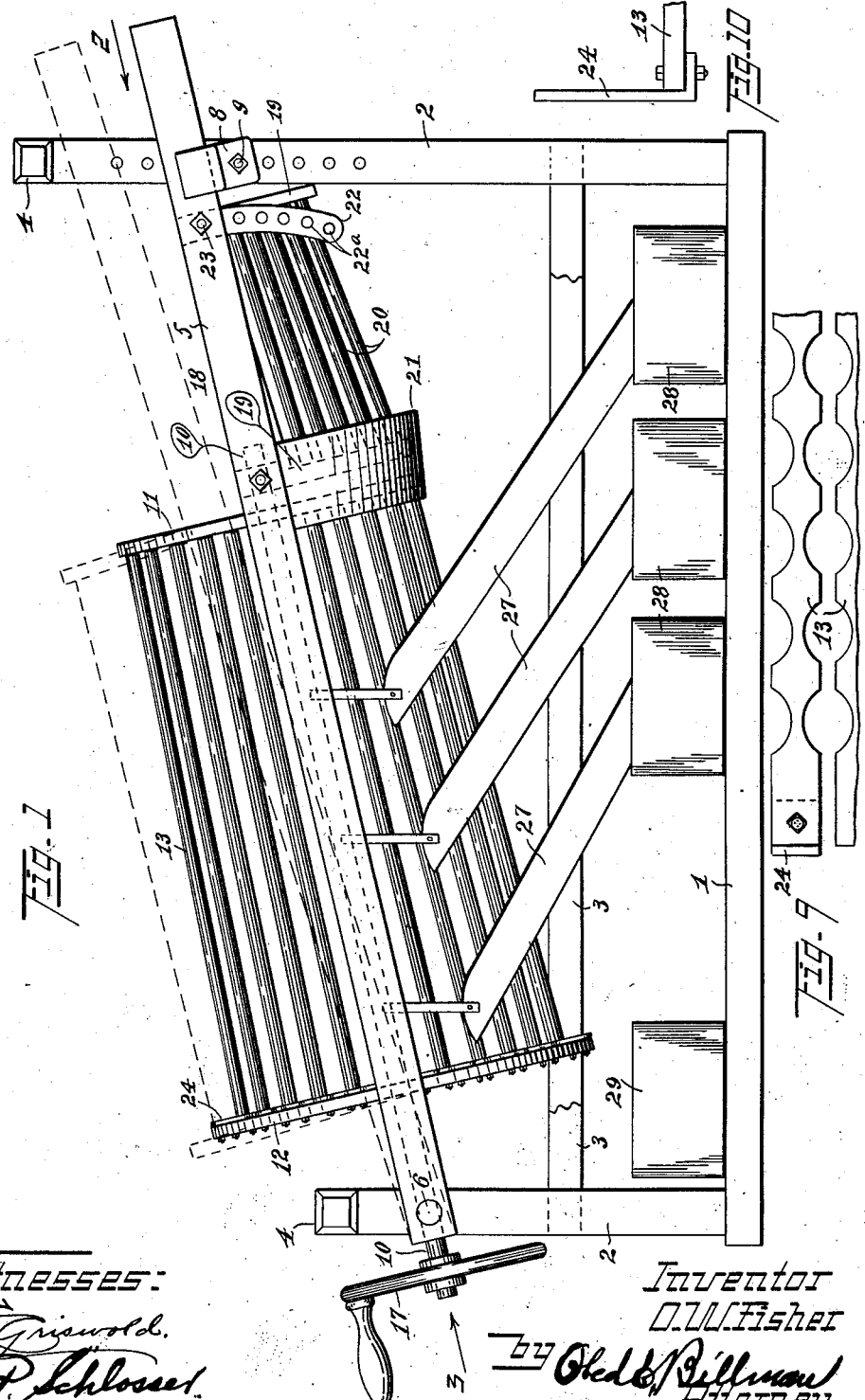
O. W. FISHER.
VEGETABLE SORTER.
APPLICATION FILED JUNE 29, 1911.
1,021,979.
Patented Apr. 2, 1912.
2 SHEETS—SHEET 1.

UNITED STATES PATENT OFFICE.

OLIVER W. FISHER, OF MADISON, OHIO.

VEGETABLE-SORTER.

1,021,979.  Specification of Letters Patent.  Patented Apr. 2, 1912.

Application filed June 29, 1911. Serial No. 635,945.

*To all whom it may concern:*

Be it known that I, OLIVER W. FISHER, a citizen of the United States, residing at Madison, in the county of Lake and State of Ohio, have invented certain new and useful Improvements in Vegetable-Sorters, of which the following is a specification.

My invention relates to improvements in vegetable sorters, and more particularly to that class which are designed and adapted to grade or classify vegetables such as onions and potatoes as well as the various kinds of fruits such as oranges, lemons, apples, pears, and the like.

The present embodiment of the invention is particularly designed and adapted for use as a sorter or grader for onions and potatoes and similar or analogous vegetables, the primary object of the invention being to provide a simple, cheap, and efficient sorter provided with improved means whereby the sorter bars of the revoluble sorter may be adjusted to regulate the size of the vegetables and whereby the angle of inclination of the revoluble sorter; and hopper at the upper end of the latter may be varied and regulated to meet the varying demands of actual service.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of the improved vegetable sorter. Fig. 2, an elevation of the hopper or vegetable receiving end of the improved sorter. Fig. 3, an elevation of the lower or discharge end of the same. Fig. 4, a perspective view of a portion of the bridge plate or member extending between the side bars of the adjustable sorter frame and beneath the receiving end of the revoluble sorter and the adjacent hopper. Fig. 5, a perspective view of one of the hopper adjusting members for adjusting the upper end of the feed hopper. Fig. 6, an enlarged fragmentary view of the lower spider wheel comprised in the revoluble sorter and the adjustable bar supporting clips carried thereby, and illustrating the manner in which the lower portions of the sorter bars may be adjusted to increase or decrease the space between the sorter bars in regulating the size of the vegetables to be sorted. Fig. 7, a sectional view of the same. Fig. 8, a fragmentary view of the upper spider wheel comprised in the improved sorter. Fig. 9, a modified form of adjustable sorter bars. Fig. 10, a side elevation of the lower end of one of the sorter bars and adjustably mounted bar supporting clips of the form shown in Fig. 9.

Similar numerals of reference designate like parts throughout all the figures of the drawings.

The improved vegetable sorter comprises a stationary frame 1, provided with end standards 2, connected by side bars 3, and cross bars 4. The stationary frame is adapted to carry an inclined adjustable sorter frame consisting, in the present instance, of sorter frame side bars 5, pivotally connected to the lower end standards 2, by means of trunnion clips 6, carrying a cross bar 7. The upper or opposite ends of the sorter frame side bars 5, are adjustably mounted and carried by the upper end standards 2, of the main frame 1, by means of supporting clips 8, the latter being adapted to be secured in various positions by means of bolts 9, adapted to be passed through bolt openings 9ª, whereby the inclination of the adjustable sorter frame together with the revoluble sorter, and the adjustable hopper carried thereby, may be varied as indicated by dotted lines in Fig. 1, of the drawings.

The improved revoluble sorter comprises an inclined shaft 10, carrying upper and lower spider wheels 11, and 12, respectively, said spider wheels being provided with and connected by a series of vegetable sorter bars 13, the lower ends of said sorter bars being adjustably mounted and connected to the lower spider wheel 12, as hereinafter described. The lower end of the shaft 10, is mounted upon the cross bar 7, by means of a suitable bearing 14 and the upper end thereof is mounted in a similar bearing 15, carried by a second cross bar 16, extending between the upper ends of the side bars 5. The shaft 10, may be driven by any suitable and convenient source of power, as for example,—by means of a hand wheel 17; and as a means for supplying vegetables to the upper or receiving end of the revoluble sorter, a vegetable hopper 18, is adjustably mounted between and carried by the side bars 5, said hopper comprising curved segmental supporting bars 19, carrying a plurality of hopper bars 20. As a means for bridging over the space between the lower hopper bar 19, and the upper or adjacent spider wheel 11, of the revoluble sorter, a curved bridge plate or member 21, is provided, said bridge member extending between the side bars 5, of the sorter frame and beneath the upper spider wheel 11, and lower hopper supporting bar 19, and as a means for adjusting the upper portion of the vegetable hopper independently of the revoluble sorter, said hopper is provided with a pair of depending segmental bars 22, provided with a series of openings 22$^a$, adapted to receive and contain supporting bolts 23, extending through the side bars 5, of the sorter frame.

As a means for radially adjusting the lower ends of the vegetable sorter bars 13, whereby to increase or decrease the space between the bars, and whereby to correspondingly increase or decrease the diameter of the lower portion of the revoluble sorter cylinder, a plurality of bar supporting clips 24, are provided, said supporting clips 24, being adjustably mounted on the inner side of the lower spider wheel 12, and held in position by means of adjusting bolts 25, passing through bolt receiving openings 26, (see Figs. 6, and 7) in the lower spider wheel. The under or contiguous surface of each supporting clip 24, is preferably provided with serrations or teeth adapted to interlock with the correspondingly serrated portions 12$^a$, on the inner side of the lower spider wheel 12.

It will at once be seen that the vegetable sorter bars 13, diverge from each other and toward the lower ends to form gradually diverging spaces through which the various grades of vegetables are adapted to pass, and if desired, chutes 27, may be provided to receive the different grades of vegetables, said chutes being adapted to direct the vegetables into boxes 28, while the best grade of vegetables are adapted to pass out at the lower end of the vegetable sorter and fall into the box 29.

The upper ends of the sorter bars may be movably and pivotally connected to the upper spider wheel 11, in any suitable and convenient manner, and where sorter bars in the form of pipe bars are used, said pipe bars may be secured to the upper spider wheel 11, by means of supporting studs 11$^a$, taking into the upper ends of the pipe bars as shown most clearly in Fig. 8, of the drawings, the supporting clips 24, being provided with similar studs 24$^a$, as shown in Figs. 6, and 7. When the improved sorter is to be used in connection with vegetables of an oblong form such as potatoes, supporting bars of the form shown in Figs. 9, and 10, are preferably employed.

From the foregoing description, taken in connection with the accompanying drawings, the operation and advantages of my invention will be readily understood.

Having thus described an embodiment of my invention, what I claim and desire to secure by Letters Patent is,—

1. In a vegetable sorter, an inclined revoluble sorter having downwardly diverging radially adjustable sorter bars, a hopper at the upper end of said sorter, means for adjusting said hopper independently of said sorter, and a plurality of chutes longitudinally arranged beneath said sorter bars.

2. In a vegetable sorter, an inclined revoluble sorter having spider heads carrying downwardly diverging sorter bars, bar supporting members mounted on one of said heads and connected to the lower ends of said sorter bars, and means for supporting and adjusting said bar supporting members radially of said head whereby the space between said bars may be regulated.

3. In a vegetable sorter, a revoluble sorter comprising an inclined shaft, upper and lower spider wheels mounted thereon, sorter bars connected to said upper spider wheel and diverging from each other toward said lower spider wheel, and means for supporting and radially adjusting the lower ends of said sorter bars on the latter and from and toward each other.

In testimony whereof I have affixed my signature in presence of two witnesses.

OLIVER W. FISHER.

Witnesses:
RUTH MOORE,
WILLIAM F. KEES.

---

Copies of this patent may be obtained for five cents each, by addressing the "Commissioner of Patents, Washington, D. C."